(12) United States Patent
Larri

(10) Patent No.: US 6,289,417 B1
(45) Date of Patent: Sep. 11, 2001

(54) OPERAND SUPPLY TO AN EXECUTION UNIT

(75) Inventor: Guy Larri, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 09/080,206

(22) Filed: May 18, 1998

(51) Int. Cl.$^7$ .................................................. G06F 12/08
(52) U.S. Cl. ............................................ 711/131; 711/118
(58) Field of Search ..................................... 711/109, 110, 711/219, 118, 131, 141, 133; 710/43, 44

(56) References Cited

U.S. PATENT DOCUMENTS

| | | | |
|---|---|---|---|
| 5,060,242 | * 10/1991 | Arbeiter | 375/241 |
| 5,583,500 | * 12/1996 | Allen et al. | 341/107 |
| 5,634,068 | * 5/1997 | Nishtala et al. | 711/141 |
| 5,761,103 | * 6/1998 | Oakland et al. | 708/497 |
| 6,009,546 | * 12/1999 | Kuglin et al. | 714/738 |

* cited by examiner

Primary Examiner—Matthew Kim
Assistant Examiner—Christian P. Chace
(74) Attorney, Agent, or Firm—Nixon & Vanderhye P.C.

(57) ABSTRACT

A microprocessor system comprising a register bank 6 and an execution unit 8 incorporating a barrel shifter 10 and an ALU 12 is provided. The register bank 6 has X read ports whilst at least some of the program instructions require Y input operands to be read from the register bank 6, where Y is greater than X. A cache register 18 is provided that caches previously read input operands for supply to the barrel shifter 10 and if it is detected that the same register is being read a second or subsequent time then this cached value is supplied to the barrel shifter 10 rather than requiring a further read from the register bank 6. A tag register 20 associated with each cache register 18 draws data indicating from which register within the register bank 6 the cached data value was copied. A valid flag 22 indicates that that cached data value is still current, i.e. at the corresponding register within the register bank 6 has not been overwritten.

14 Claims, 3 Drawing Sheets

OPERAND SUPPLY TO AN EXECUTION UNIT

BACKGROUND OF THE INVENTION

1. Field of the Invention

This invention relates to the field of data processing. More particularly, this invention relates to data processing systems that include a register bank having a plurality of registers that store operand values to be used by an execution unit in performing a data manipulation under program instruction control.

2. Description of the Prior Art

It is known to provide data processing systems having a register bank made up of a plurality of registers each storing data values to be manipulated or to control manipulation. The operand values within these registers are supplied to an execution unit via read ports of the register bank with the result being written back via one or more write ports to the register bank. Considerations of circuit layout and area vs cost and/or speed mean that it is desirable to provide a limited number of read ports from the register bank that can provide simultaneous read access to different registers within the register bank. Certain program instructions may require more input operands to be read from the register bank than there are available read ports to read those operands within a single read cycle. In this case, instruction execution is slowed by the need to provide multiple read cycles of the register bank.

An example of a data processing system of the above type is the ARM7 microprocessor produced by Advanced RISC Machines Limited of Cambridge, England. This microprocessor has a register bank having two read ports. However, some program instructions require three input operands to be read from the registers of the resister bank. An example of such a program instruction is one that multiplies the contents of two registers together with one of those input operands to be multiplied being first shifted by an amount that is specified as a data value stored within another register of the register bank. In this case, two read cycles are required to recover the three necessary input operands from the register bank via the two read ports.

SUMMARY OF THE INVENTION

Viewed from one aspect the present invention provides an apparatus for processing data, said apparatus comprising: a register bank having a plurality of registers for storing data values to be manipulated, said register bank having X read ports for allowing simultaneous reading of data values from X registers during a read cycle;
an execution unit for performing at least one data processing operation, specified by a data processing instruction, that requires Y input operands from Y registers, where said data processing instruction specifies which Y registers are to supply said Y input operands;
one or more cache registers for storing as cached data values copies of data values stored within one or more corresponding ones of said plurality of registers of said register bank; and
a cache register controller coupled to said one or more cache registers for detecting if said data processing instruction specifies within said Y input operands any data values stored in a register of said register bank of which a copy is stored in said one or more cache registers as a cached data value, and, if so, supplying said cached data value to said execution unit as said one of said Y input operands rather than reading said data value from said register bank, whereby the number of data values that require reading from said register bank via said X read ports is reduced.

The invention recognises that in many cases one of the data values being read from a register as an input operand is re-used over many subsequent program instructions (not necessarily immediately following) and accordingly a significant increase in performance can be achieved by caching one of the input operands outside of the register bank so as to reduce the number of data values that need to be read through the read ports of the register bank. As an example of the type of data processing in which this may be highly useful is image data manipulations upon large blocks of pixel data for which it is common to provide the same shift value specified within a register to many hundreds or thousands of pixel values that are being manipulated. If this shift value can be cached outside of the register bank for supply to a shifter, then the number of read cycles for each instruction can be reduced resulting in a large increase in performance. This increase in performance is sufficient to justify the additional overhead of the hardware required to provide and control this register caching capability. Avoiding a repeated register read may also save power. It will be appreciated that the way in which a data processing instruction specifies a register to be used may be explicit (e.g. a field within the instruction) or implicit (e.g. a stack push instruction that always uses a fixed register to provide the stack pointer).

The invention reduces the demands made upon the read ports of the register bank. The read port may not all be quick or have appropriate timing requirements and so it can be advantageous to avoid the need to have to use slow or difficult to time read ports through use of the invention. In the case where Y>X, the invention is especially useful as in this case there are insufficient read ports available to allow for all the operands to be read from the register bank together and so having some of these values cached outside the register bank can reduce the bottleneck.

Whilst the reduction of the number of reads that need to be made through the read ports of the register bank is desirable in general, it is particularly advantageous in embodiments in which Y=X+1 such that, when a cached data value from said one or more cache registers is used rather than reading a corresponding data value from said register bank, the number of data values that require reading from said register bank is reduced to X data values that may all be read in a single read cycle.

In the above circumstance, the provision of the cache registers of the present invention serves to reduce the number of read cycles required from two to one by taking the number of operands that need to be recovered from the register bank from just above the number of read ports available to a number equal to the number of read ports that are available to read those data values in a single cycle.

The cached operand value may be used as an input to many different functional units that form part of the execution unit, e.g. a multiplier or an ALU. However, the invention is particularly advantageous in embodiments in which said execution unit includes a shifter for shifting one of said Y input operands by a shift amount specified by another of said Y input operands, said one or more cache registers operating to cache said shift amounts.

As mentioned above, processing operations in which the same shift value (or a small set of shift values) is applied to a very large number of successive data processing operations are relatively common and performance critical and so the present invention is particularly useful in these circumstances.

The potential complications of introducing the cache register controller into what might be a critical path within the operation of the system can be reduced in embodiments in which there is provided an instruction pipeline along stages of which data processing instructions are passed before reaching an execution stage at which said data processing instructions are executed by said execution unit, said cache register controller being responsive to said data processing instructions within a stage of said instruction pipeline before said execution stage said such that said detection by said cache register controller for a given data processing instruction can be commenced prior to said given data processing instruction reaching said execution stage.

Within a pipelined system, the cache register controller can read the data indicating which registers are specified as supplying the input operands before the relevant data processing instruction reaches the execution stage of the pipeline so providing sufficient time for the cache register controller to determine whether or not any of the cache registers holds an appropriate copy cached data value that may be used instead of having to perform a read from the register bank via one of the read ports. The cache data value can also be read from the cache register early to provide additional set-up time for the execution unit that is responsive to that cache data value.

In order to manage the control of the cache registers, in preferred embodiments of the invention each cache register has an associated tag register indicating from which, if any, of said registers of said register bank said cache register is storing a copy of said data value as a cached data value.

A tag register indicating which register number of the main register bank each cache register is storing a copy of provides a convenient mechanism for controlling the cache registers.

Accordingly, in preferred embodiments of the invention said cache register controller compares contents of said tag registers with at least one portion of said data processing instruction specifying which registers of said register bank store said Y input operands (which may involve some decoding logic in the case where the register is implied rather than specified) in order to detect if one of said Y input operands is cached within said cache registers.

It will be appreciated that the data value within a register of the register bank for which a copy is being held as a cached data value within one of the cache registers may be overwritten. It may be considered that it would be appropriate to attempt to at this stage copy this new value over to the cache register. This causes a problem in ensuring consistency with what is cached.

In preferred embodiments of the invention each cache register has an associated valid flag indicating whether said cache register is storing as a cached data value a valid current copy of a data value from a register within said register bank.

The provision of such valid flags allows in preferred embodiments said cache register controller to detect when a register within said register bank corresponding to a cached data value within a cache register is written, and then reset an associated valid flag for said cache register to indicate that said cached data value is no longer a valid current copy of said data value stored in said register within said register bank. If the system is pipelined, then this allows extra time for this clearing of the valid flag to be performed.

Whilst the number of read ports X, the number of input operands Y and the number of cache registers could take many values, the present invention has been found to be particularly advantageous in embodiments in which X=2, Y=3 and two cache registers are provided.

In practice it is found that the present invention is particularly useful in association with certain elements within the execution unit that perform manipulations of a type in which there is a very high reuse of input operand values. Accordingly, the implementation of the invention can be made less burdensome with the majority of the benefits of the invention realised in embodiments in which one or more cache registers are associated with a particular input operand to said execution unit and serve to cache each new data of said particular input operand value read from said register bank by overwriting a previously cached example of said particular operand as necessary.

In this way, for example, the shift value input operand to a shifter may be cached whenever a new value for this operand is read from the register bank as there is a high probability that this shift value will be reused.

Whilst the present invention could take many forms, it is particularly suited to embodiments in which said execution unit includes a barrel shifter, and in which wherein said apparatus comprises a microprocessor.

Viewed from another aspect the present invention provides A method of processing data, said method comprising the steps of:

storing within a register bank having a plurality of registers data values to be manipulated, said register bank having X read ports for allowing simultaneous reading of data values from X registers during a read cycle;

performing with an execution unit at least one data processing operation, specified by a data processing instruction, that requires Y input operands from Y registers, where said data processing instruction specifies which Y registers are to supply said Y input operands;

storing within one or more cache registers as cached data values copies of data values stored within one or more corresponding ones of said plurality of registers of said register bank; and detecting, with a cache register controller coupled to said one or more cache registers, if said data processing instruction specifies within said Y input operands any data values stored in a register of said register bank of which a copy is stored in said one or more cache registers as a cached data value, and, if so, supplying said cached data value to said execution unit as said one of said Y input operands rather than reading said data value from said register bank, whereby the number of data values that require reading from said register bank via said X read ports is reduced.

The above, and other objects, features and advantages of this invention will be apparent from the following detailed description of an illustrative embodiment which is to be read in connection with the accompanying drawings.

DETAILED DISCUSSION OF PREFERRED EMBODIMENTS

Figure 1:
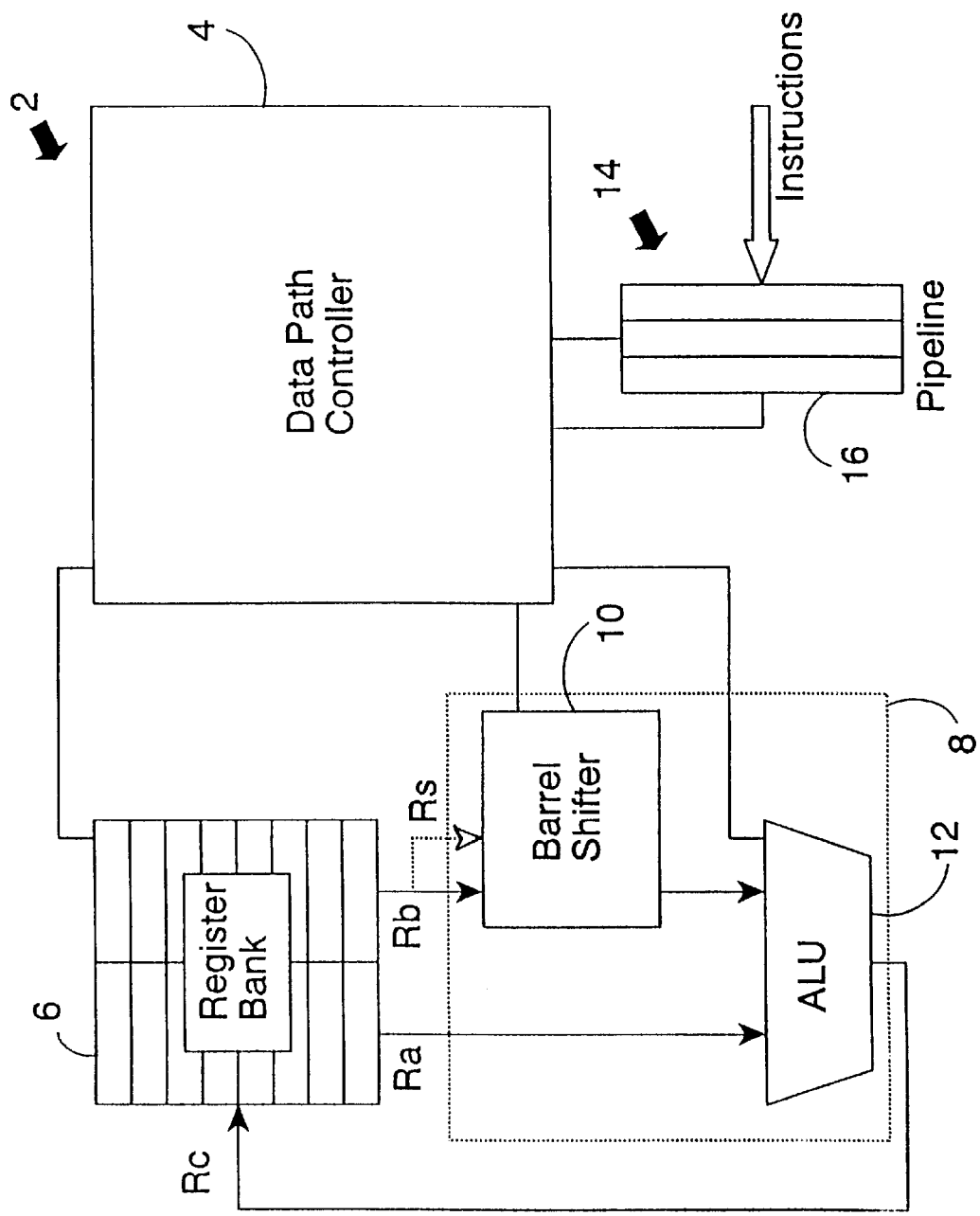
FIG. 1 illustrates a prior art microprocessor incorporating a register bank and an execution unit in which multiple read cycles of the register bank are required when the number of input operands exceeds the number of read ports.

FIG. 1 shows a microprocessor 2 having a data path controller 4, a register bank 6 and an execution unit 8. In this example, the execution unit 8 is illustrated in simplified form as containing only a barrel shifter 10 and an ALU 12. In practice, many more (or different) functional units may be provided within the execution unit 8. An instruction pipeline 14 receives program instruction words from a memory and passes these along the pipeline 14 until they reach an execution stage 16. Fields within the instructions are read by the data path controller 4 prior to the instruction reaching the execution stage in order that the data path controller 4 can set up the register bank 6 and the execution unit 8 appropriately to perform the data manipulation specified by the program instruction.

In the example of FIG. 1, two data values Ra and Rb are to be read from the two read ports of the register bank 6. The data value Rb is to be subjected to a shifting operation by the barrel shifter 10 by a shift amount specified as data value s stored within another of the registers of the register bank 6. As it is not possible to simultaneously read three registers of the register bank, within a first read cycle the shift value Rs is read and supplied to the barrel shifter 10 and latched. In a second read cycle the values Ra and Rb are read, the value Rb being shifted by the barrel shifter and then the shifted result together with Ra being subject to a specified manipulation by the ALU 12. The result of the manipulation by the ALU 12 is a value Rc that is written back via a write port to the register bank 6.

Thus, it will be seen from FIG. 1 that two read cycles are required for each occurrence of the above operation even if the value Rs remains unchanged. In practice when manipulating image data, this sort of operation is quite common and the value Rs will remain unchanged for many hundreds if not thousands of data processing operations, or that there will be a small set of values (e.g. two) that are switched between.

Figure 2:
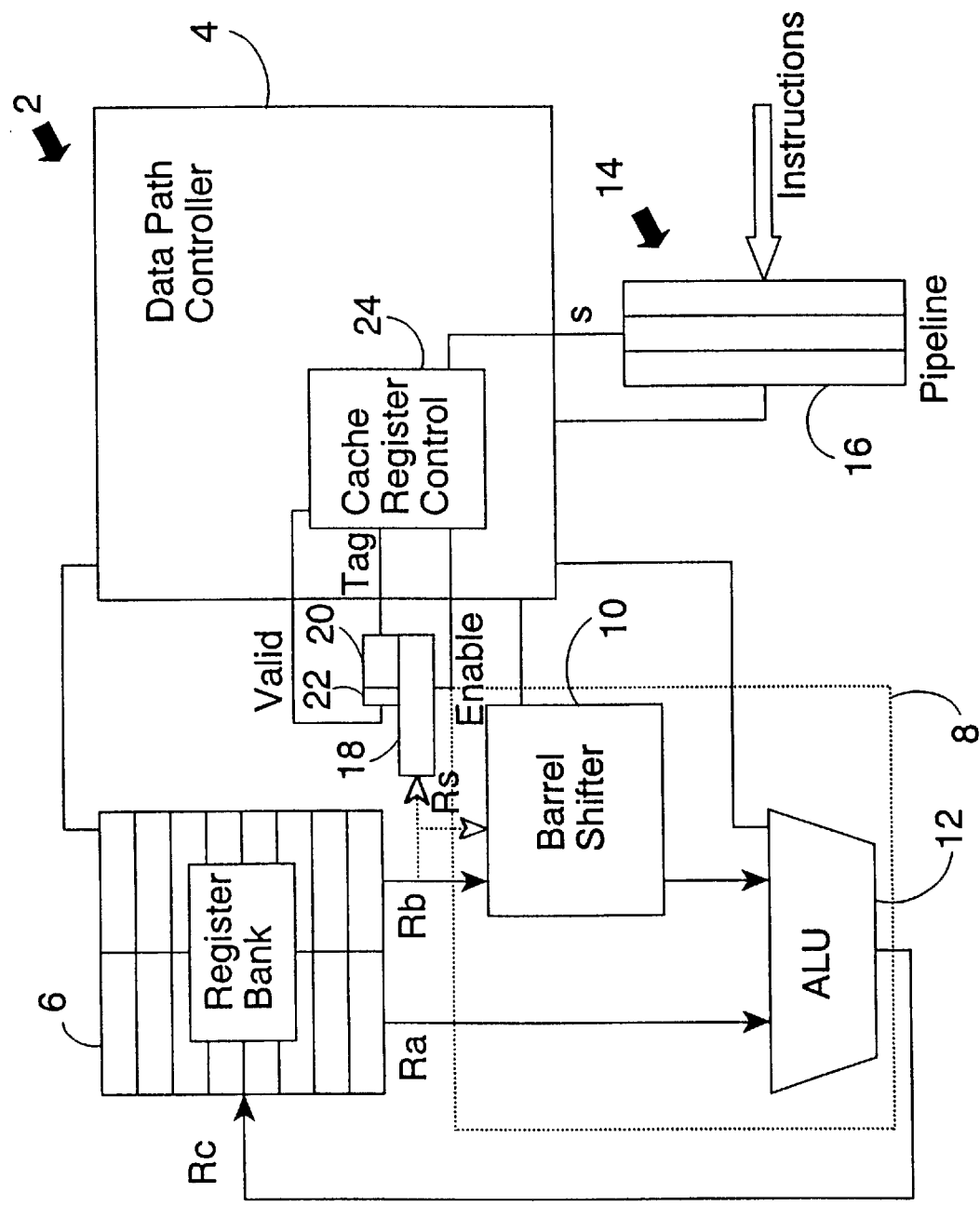
FIG. 2 illustrates an embodiment of the present invention in which cache registers and a cache register controller are provided.

FIG. 2 illustrates one example embodiment of the invention. In this example embodiment a cache register 18 is provided that serves to cache each new value of the shift input operand Rs that is output from the register bank 6 overwriting any already cached values as necessary. A tag field 20 associated with the cache register 18 stores data indicating the register from which the value Rs was read within the register bank 6. A valid flag 22 serves to indicate that the corresponding register within the register bank 6 has not been overwritten since its contents were cached within the cache register 18.

As a program instruction progresses along the pipeline 14, a cache register controller 24 is responsive to a register specifying field within the program instruction that indicates that the shift value is stored within a register s of the register bank 6. The cache register controller 24 is able to read this value of s prior to that program instruction reaching the execution stage 16 of the pipeline 14. When the cache register controller 24 has read this register number s, it compares it with the current Tag value stored within the tag register 20. If this matches and the valid bit indicates that the cache data value is still valid, then the cache register controller 24 in cooperation with the data path controller 4 serves to enable the shift operand to be read from the cache register 18 rather than being read from the register bank 6. In addition, the data path controller 4 modifies the number of read cycles for the instruction such that when the shift value is cached in this way, only a single read cycle is taken with the shift operand being provided at an appropriate advanced timing to the barrel shifter 10 to allow the barrel shifter 10 to set up to perform the required shift operation.

Figure 3:
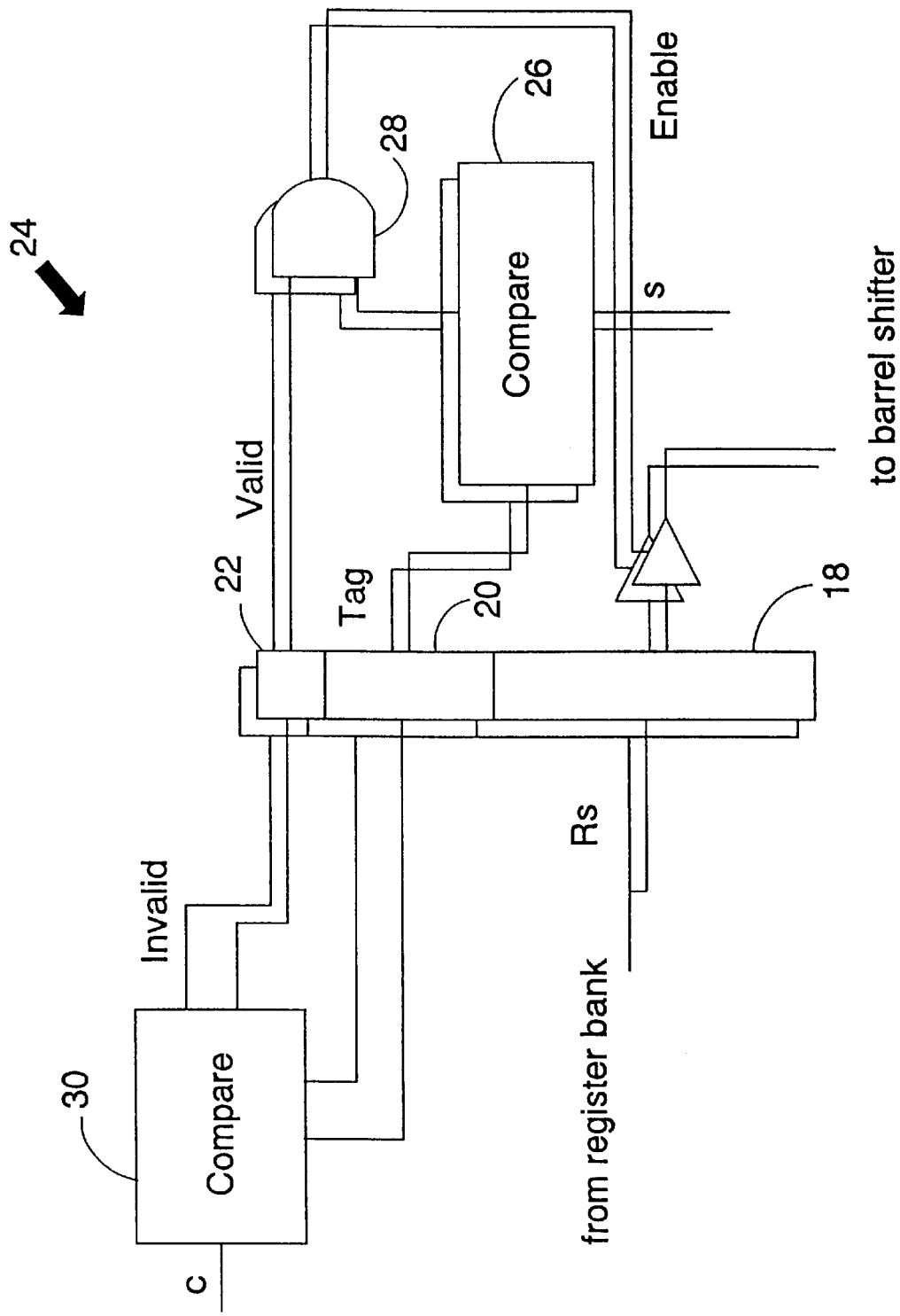
FIG. 3 illustrates a portion of the cache register controller of FIG. 2 in more detail.

FIG. 3 illustrates a portion of the cache register controller 24 in more detail. In this embodiment two cache registers 18 are provided. Each has an associated tag register 20 and valid flag 22. When a register number s is read from the pipeline 14, it is supplied to comparators 26 that serve to compare this input value with the tag values within the tag registers 20. If there is a match, then the comparators 26 output a true value for the appropriate one of the cache registers 18. This true value is ANDed by a gate 28 with the associated valid flag. If there is a tag match and the valid flag indicates that the cached data value is still valid, then an enable signal is supplied to the cache register IS that triggers it to output its value to the barrel shifter 10.

A write comparator 30 serves to monitor which register numbers c are being written to within the register bank 6 and compares these with the currently stored tag values within the tag registers 20. If there is a match, then this indicates that the corresponding register within the register bank has now been overwritten and accordingly, the corresponding cache register is marked as invalid using the valid flag 22. In a pipelined system care needs to be taken to ensure that the valid bit is cleared neither too early or too late in a manner that could interfere with other instructions in the pipeline. A similar approach of register forwarding or register interlocking that is used in standard pipelines may be adopted.

Although illustrative embodiments of the invention have been described in detail herein with reference to the accompanying drawings, it is to be understood that the invention is not limited to those precise embodiments and that various changes and modifications can be effected therein by one skilled in the art without departing from the scope and spirit of the invention as defined by the appended claims.

I claim:

1. Apparatus for processing data, said apparatus comprising:

a register bank having a plurality of registers for storing data values to be manipulated, said register bank having X read ports, where X is an integer greater than 1, for allowing simultaneous reading of data values from X registers during a read cycle;

an execution unit coupled to said X read ports for performing at least one data processing operation, specified by a data processing instruction, that requires Y input operands from Y registers, where Y is greater than X, and where said data processing instruction specifies which Y registers are to supply said Y input operands;

one or more cache registers for storing as cached data values copies of data values stored within one or more corresponding ones of said plurality of registers of said register bank; and a cache register controller coupled to said one or more cache registers for detecting if said data processing instruction specifies within said Y input operands any data values stored in a register of said register bank of which a copy is stored in said one or more cache registers as a cached data value, and, if so, supplying said cached data value to said execution unit as said one of said Y input operands rather than reading said data value from said register bank, whereby the number of data values that require reading from said register bank via said X read ports is reduced.

2. Apparatus as claimed in claim 1, wherein Y=X+1 such that, when a cached data value from said one or more cache registers is used rather than reading a corresponding data value from said register bank, the number of data values that require reading from said register bank is reduced to X data values that may all be read in a single read cycle.

3. Apparatus as claimed in claim 1, wherein said execution unit includes a shifter for shifting one of said Y input operands by a shift amount specified by another of said Y input operands, said one or more cache registers operating to cache said shift amounts.

4. Apparatus as claimed in claim 1, comprising an instruction pipeline along stages of which data processing instructions are passed before reaching an execution stage at which said data processing instructions are executed by said execution unit, said cache register controller being responsive to said data processing instructions within a stage of said instruction pipeline before said execution stage said such that said detection by said cache register controller for a given data processing instruction can be commenced prior to said given data processing instruction reaching said execution stage.

5. Apparatus as claimed in claim 1, wherein each cache register has an associated tag register indicating from which, if any, of said registers of said register bank said cache register is storing a copy of said data value as a cached data value.

6. Apparatus as claimed in claim 5, wherein said cache register controller compares contents of said tag registers with at least one portion of said data processing instruction specifying which registers of said register bank store said Y input operands in order to detect if one of said Y input operands is cached within said cache registers.

7. Apparatus as claimed in claim 1, wherein each cache register has an associated valid flag indicating whether said cache register is storing as a cached data value a valid current copy of a data value from a register within said register bank.

8. Apparatus as claimed in claim 6, wherein said cache register controller detects when a register within said register bank corresponding to a cached data value within a cache register is written, and then resets an associated valid flag for said cache register to indicate that said cached data value is no longer a valid current copy of said data value stored in said register within said register bank.

9. Apparatus as claimed in claim 1, wherein X=2 and Y=3.

10. Apparatus as claimed in claim 1, wherein two cache registers are provided.

11. Apparatus as claimed in claim 1, wherein one or more cache registers are associated with a particular input operand to said execution unit and serve to cache each new data value of said particular operand read from said register bank by overwriting a previously cached example of said particular operand as necessary.

12. Apparatus as claimed in claim 1, wherein said execution unit includes a barrel shifter.

13. Apparatus as claimed in claim 1, wherein said apparatus comprises a microprocessor.

14. A method of processing data, said method comprising the steps of:

storing within a register bank having a plurality of registers data values to be manipulated, said register bank having X read ports, where X is an integer greater than 1, for allowing simultaneous reading of data values from X registers during a read cycle;

performing with an execution unit coupled to said X read ports at least one data processing operation, specified by a data processing instruction, that requires Y input operands from Y registers, where Y is greater than X and where said data processing instruction specifies which Y registers are to supply said Y input operands;

storing within one or more cache registers as cached data values copies of data values stored within one or more corresponding ones of said plurality of registers of said register bank; and detecting, with a cache register controller coupled to said one or more cache registers, if said data processing instruction specifies within said Y input operands any data values stored in a register of said register bank of which a copy is stored in said one or more cache registers as a cached data value, and, if so, supplying said cached data value to said execution unit as said one of said Y input operands rather than reading said data value from said register bank, whereby the number of data values that require reading from said register bank via said X read ports is reduced.

* * * * *